(No Model.)  2 Sheets—Sheet 1.
O. M. MUNCASTER.
BAIT BUCKET.
No. 521,244. Patented June 12, 1894.
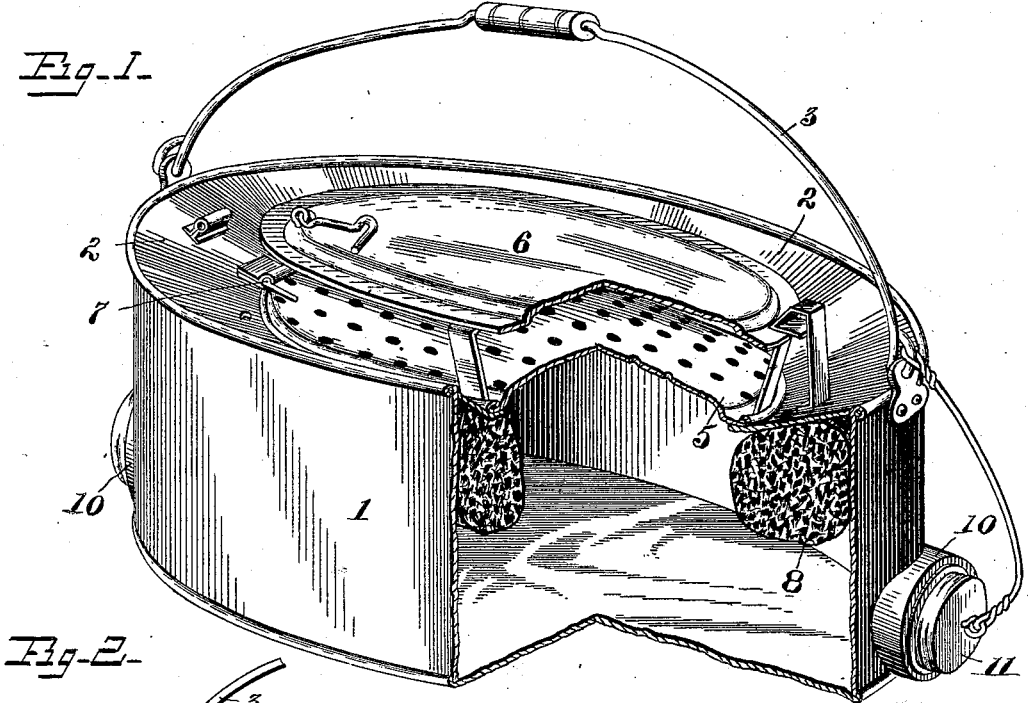
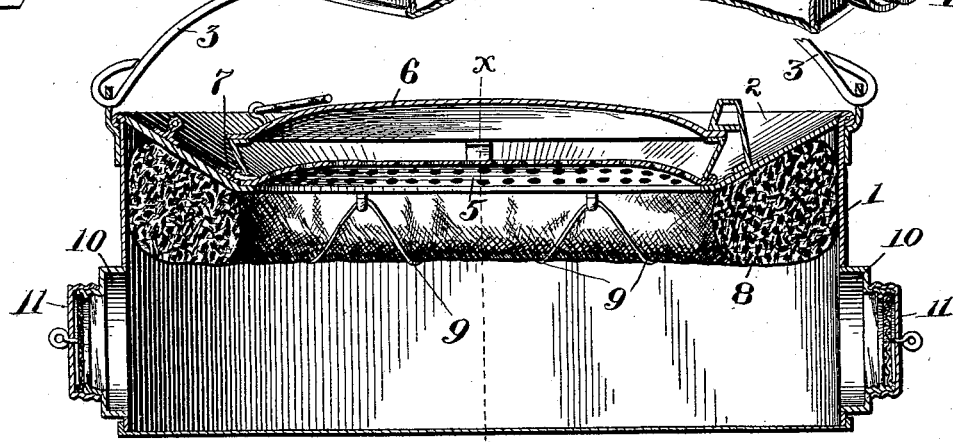
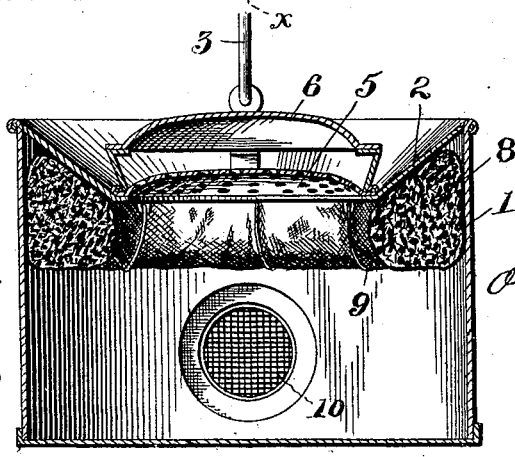
WITNESSES
Howard D. Orr
H. S. Shepard
INVENTOR
Otho M. Muncaster (No Model.) 2 Sheets—Sheet 2.
O. M. MUNCASTER.
BAIT BUCKET.
No. 521,244. Patented June 12, 1894.
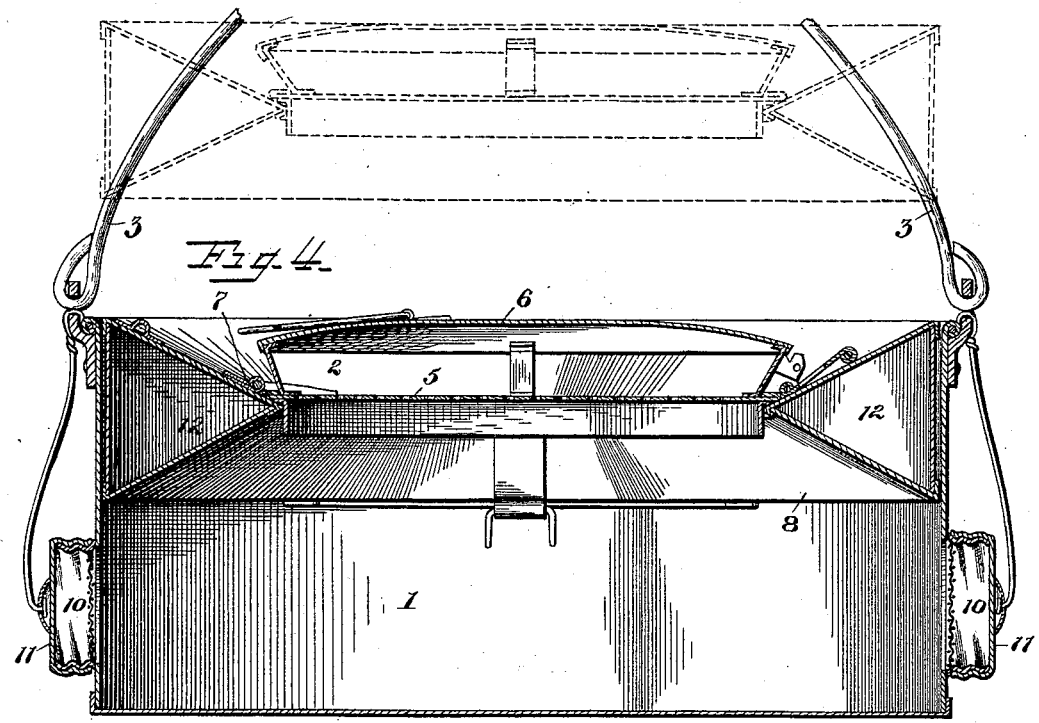
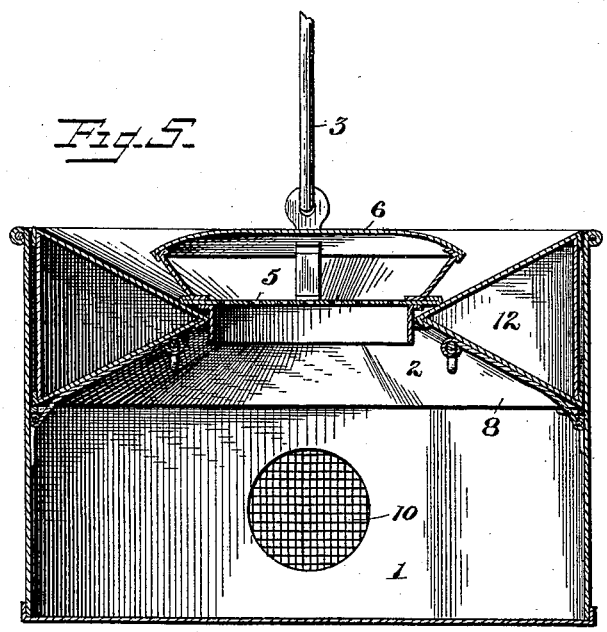
WITNESSES
Howard N. Orr
N. T. Shepard
INVENTOR
Otho M. Muncaster
By J. A. Littell
his Attorney

UNITED STATES PATENT OFFICE.

OTHO M. MUNCASTER, OF WASHINGTON, DISTRICT OF COLUMBIA.

BAIT-BUCKET.

SPECIFICATION forming part of Letters Patent No. 521,244, dated June 12, 1894.

Application filed March 28, 1894. Serial No. 505,396. (No model.)

*To all whom it may concern:*

Be it known that I, OTHO M. MUNCASTER, a citizen of the United States, residing in the city of Washington, District of Columbia, have invented an Improvement in Bait-Buckets, of which the following is a specification, reference being had to the accompanying drawings, in which—

Figure 1 is a perspective view of my invention, a part thereof being broken away to show the interior arrangement. Fig. 2 is a vertical, longitudinal section of the same, and Fig. 3, a transverse section, on the line $x$—$x$ of Fig. 2. Fig. 4 is a vertical longitudinal sectional view, illustrating a modified construction. Fig. 5 is a transverse sectional view of said modification.

In the transportation and care of live bait, various devices have been employed, the object thereof being to keep the bait alive and healthy in transit to the fishing grounds and after arrival thereat.

In what are known as "floating bait buckets" a permanent air-chamber has been employed to render the bucket buoyant when in water, but such a construction not only adds to the weight of the bucket by increasing the amount of metal therein, but is also defective in that, when the wall of the air-chamber is pierced by striking a rock or from other cause, water will enter and fill the chamber, overcoming the buoyant effect thereof, and the bucket sinks.

My invention is primarily designed to overcome the defects above-mentioned, and to produce a bucket the buoyant qualities of which can always be relied upon, and one which also is provided with means for shielding the bait from the sun, and with valved or capped passages or openings permitting a free circulation of water through the bucket.

In the drawings, like numerals are placed on like parts in the several views.

1 represents a bucket, formed of suitable material and provided with a depressed or cup-shaped top, having inclined walls 2, and with the usual bail or handle 3. Over the opening in the top through which the bait are placed in and withdrawn from the bucket is a cover 5, perforated to permit the entrance of air, and over this cover is located an awning 6, which shields the bait from the rays of the sun, and prevents the water in which they are kept from becoming heated. The part 6 is also adapted to act as a support for ice, holding it from close contact with the surface of the water, and avoiding too sudden chilling of the same. As represented, the cover and awning are separated from, and connected to each other by suitable spacing-pieces, and the combined device is hinged to the top of the bucket at 7, a suitable hook and spring catch being provided for holding it either open or closed.

8 represents a float composed of any suitable water-proof and buoyant material, here represented as detachably connected to the under side of the top of the bucket by fastenings 9, although it may be differently located. As illustrated, the float is of annular form and is composed of scraps or waste of cork, although other material may, of course, be employed.

A detachable air-chamber located within the bucket, and protected from injury by the walls thereof, would come within the purview of this part of my invention, one form embodying this construction being illustrated in Figs. 4 and 5 of the drawings, in which the whole top of the bucket is removable and carries an annular air chamber, 12, depending from said removable top and surrounding the opening therein. In this modified construction, it will be noted that the float, cover 5, and awning 6, being all carried by the removable top, are separable from the bucket. It will be further understood that detachable floats of other materials and forms, and differently located with relation to the bucket could also be employed. It is also obvious that the annular float could be made to surround the outside of the bucket, although I prefer the arrangement shown as more sightly and convenient.

10, 10 represent hollow projections constituting water-circulating passages, closed at the ends by wire gauze or other reticulated material, and provided with suitable valves or caps 11.

My invention is designed to operate as follows:—The hinged cover and awning are raised and secured in position, the bucket is filled with water, and the minnows or other live bait placed therein, and the lid is closed.

During transportation, the awning 6 prevents the water from splashing out, and the inclined sides 2 direct it back into the bucket. While fishing, the caps or other valves 11 are opened or removed, and the bucket, (connected as a tow to the boat or otherwise,) is placed in the water, which freely circulates through it, keeping the bait in healthy condition.

It is obvious that the entire top of the bucket could be hinged or otherwise made removable, so that the float can be rendered easily accessible.

Having thus described my invention, what I claim, and desire to secure by Letters Patent, is—

1. A bait bucket provided with water-circulating passages in its sides and means for closing said passages when the bucket is out of water, and having a float located inside of, and protected by the walls thereof, substantially as and for the purpose specified.

2. A bait bucket provided with water-circulating passages in its sides and means for closing said passages when the bucket is out of water, and having an annular float composed of cork or other buoyant material, substantially as and for the purpose specified.

3. A bait bucket provided with water-circulating passages in its sides and means for closing said passages when the bucket is out of water, and having an annular float surrounding the opening in the bucket, and located inside thereof, substantially as and for the purpose specified.

4. A bait bucket provided with water-circulating passages in its sides and means for closing said passages when the bucket is out of water, and having a detachable and independent float, substantially as and for the purpose specified.

5. In combination with a bait bucket provided with water-circulating passages in its sides and means for closing said passages when the bucket is out of water, a cover and a detachable float surrounding the opening closed by the cover, substantially as and for the purpose specified.

6. In combination with a bait bucket provided with water-circulating passages in its sides and means for closing said passages when the bucket is out of water, a hinged cover, an annular float surrounding the opening closed by the cover, and means for connecting the float to the under side of the top of the bucket, substantially as and for the purpose specified.

7. A bait bucket provided with a reticulated cover, and an awning or shield located over said cover, substantially as and for the purpose specified.

8. In combination with a bait bucket, a protecting awning or shield arranged over the top opening thereof, substantially as set forth.

9. In combination with a bait bucket, a reticulated cover hinged to the top of the bucket, and an awning or shield connected to the cover and spaced apart therefrom, substantially as and for the purpose specified.

10. In a bait bucket provided with a top inclined toward a central opening, the combination of a movable cover, an awning above the cover, and a float surrounding the opening closed by the cover, substantially as and for the purpose specified.

11. In a bait bucket having a top inclined toward a central opening, the combination of the hinged, reticulated cover, the awning above, and connected to the cover, and the annular float detachably secured to the under side of the top of the bucket, and surrounding the opening closed by the cover, substantially as and for the purpose specified.

12. In combination with a bait bucket having water-circulating passages and valves for opening or closing such passages, a detachable float secured to the interior of the bucket, a hinged reticulated cover, an awning spaced apart from and connected to the cover, and means for securing the cover and awning in either an open or closed position, substantially as and for the purpose specified.

13. A bait bucket, comprising the bucket proper provided with water-circulating passages in its sides and with screw taps or valves for closing said passages when the bucket is out of water, and an annular float connected with said bucket, substantially as set forth.

14. A bait bucket, comprising the bucket proper provided with water-circulating passages in its sides and means for closing said passages when the bucket is out of water, in combination with a top or cover carrying a float and provided with an opening closed by a reticulated cover, substantially as set forth.

15. A bait bucket, comprising the bucket proper provided with water-circulating passages in its sides and means for closing said passages when the bucket is out of water, in combination with a top or cover carrying a float and provided with an opening closed by a reticulated cover and an awning or shield protecting said cover, substantially as set forth.

16. A bait bucket, comprising the bucket proper provided with water-circulating passages in its sides and means for closing said passages when the bucket is out of water, in combination with a top or cover carrying a float and provided with an opening closed by a reticulated cover, the top being inclined toward said opening, and an awning or shield arranged above the reticulated cover, substantially as set forth.

17. A bait bucket, comprising the bucket proper provided with water-circulating passages in its sides and with screw taps or valves for closing said passages when the bucket is out of water, a top carrying an annular float depending from its under side and protected by the walls of said bucket, said top being inclined toward a central opening, a reticulated cover for closing said opening, and an awning or shield arranged above said cover, substantially as set forth.

18. A bait bucket provided with a float for supporting the same in the water and having water-circulating passages in its sides and means for closing said passages when the bucket is out of water, substantially as set forth.

OTHO M. MUNCASTER.

Witnesses:
E. H. SHUSTER,
WM. H. DE LACY.